United States Patent [19]
Imaide et al.

[11] 4,249,213
[45] Feb. 3, 1981

[54] PICTURE-IN-PICTURE TELEVISION RECEIVER

[75] Inventors: Takuya Imaide; Tomomitsu Kuroyanagi; Michio Masuda, all of Yokohama, Japan

[73] Assignee: Hitachi, Ltd., Japan

[21] Appl. No.: 74,761

[22] Filed: Sep. 11, 1979

[30] Foreign Application Priority Data

Sep. 14, 1978 [JP] Japan .................................. 53/113316
May 11, 1979 [JP] Japan .................................. 54/57106
Jul. 30, 1979 [JP] Japan .................................. 54/96144

[51] Int. Cl.³ .............................................. H04N 5/22
[52] U.S. Cl. .................................................. 358/183
[58] Field of Search ................ 358/181, 182, 183, 185

[56] References Cited

U.S. PATENT DOCUMENTS 4,139,860  2/1979  Micic et al. ............................. 358/22

OTHER PUBLICATIONS

Electronics, pp. 102–106, Sep. 1, 1977.

Primary Examiner—Robert L. Richardson
Attorney, Agent, or Firm—Craig & Antonelli

[57] ABSTRACT

A picture-in-picture television receiver is disclosed in which a television picture to be inset is compressed at a compression rate of 1/n and inset as a small-picture in part of a main television picture or large picture, and a single field memory for small-picture reproduction is provided therein in or from which a video signal can be randomly read and written line by line as a unit. In the single field memory is stored the small-picture video signal line by line by the application of a writing clock in which case the time taken in the writing is less than 1/(n+1) of a horizontal period. Then, from the memory is read the stored small-picture information by the application of a reading clock of n times the frequency of the writing clock during the time that writing is not performed, and supplied to be inset in the main television picture. A small-capacity buffer memory is provided at the prestage or following stage of the field memory to prevent the read/write timing overlap in the field memory irrespective of whether the small-picture and the main television picture are synchronized or not in the transmission systems. Thus, the capacity of the field memory essential for the small-picture is about a half of the conventional one.

11 Claims, 36 Drawing Figures

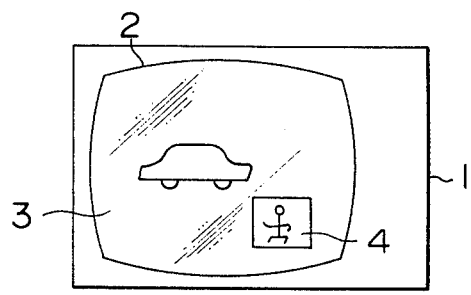
FIG. I
PRIOR ART
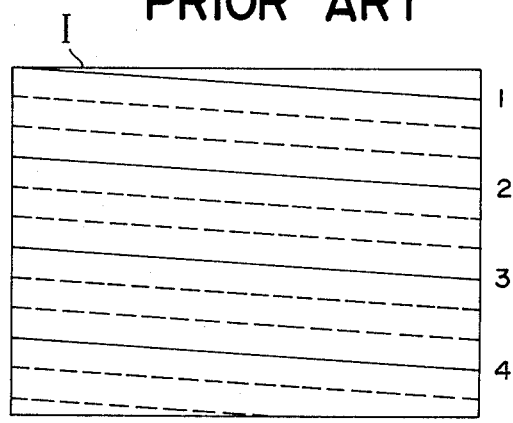
FIG. 2A
PRIOR ART
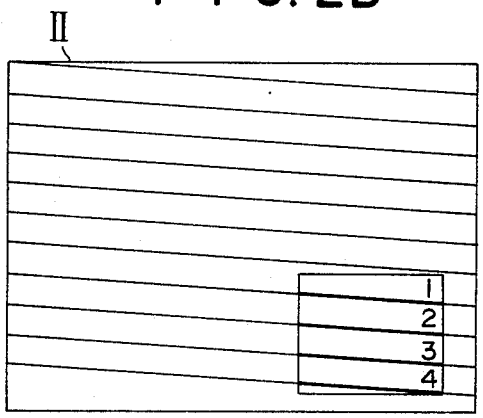
FIG. 2B

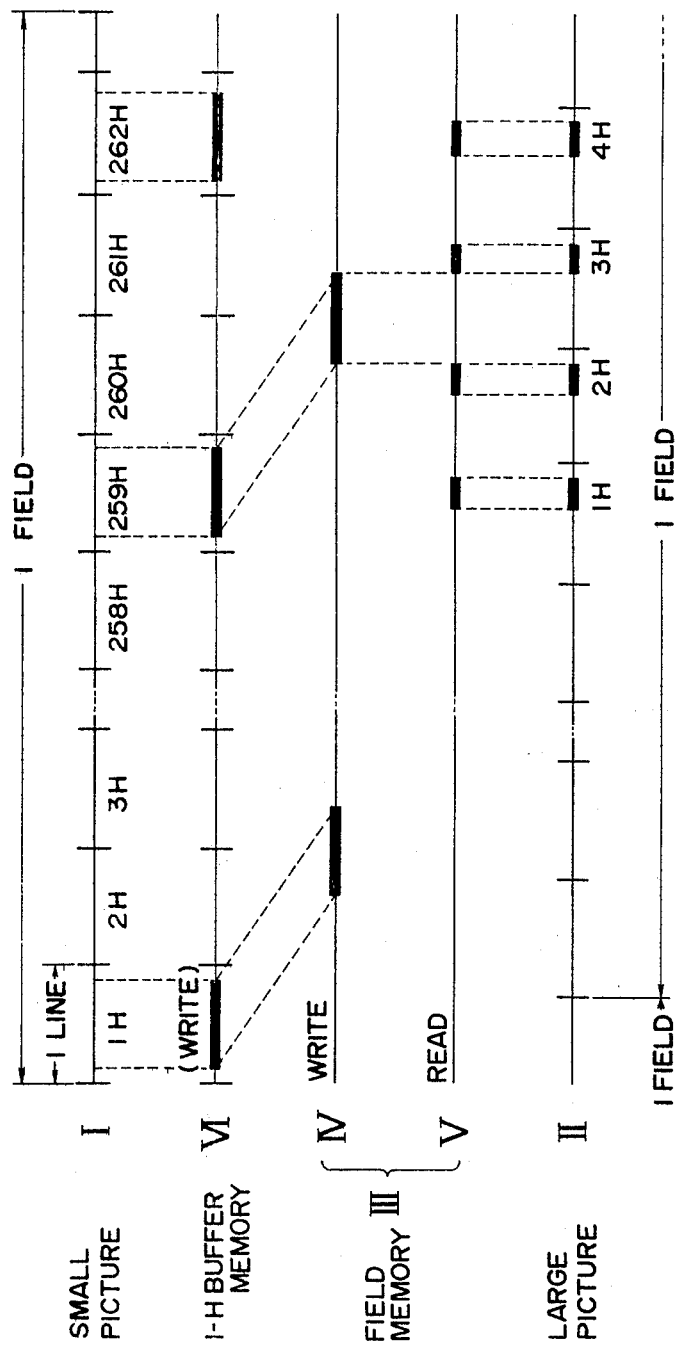

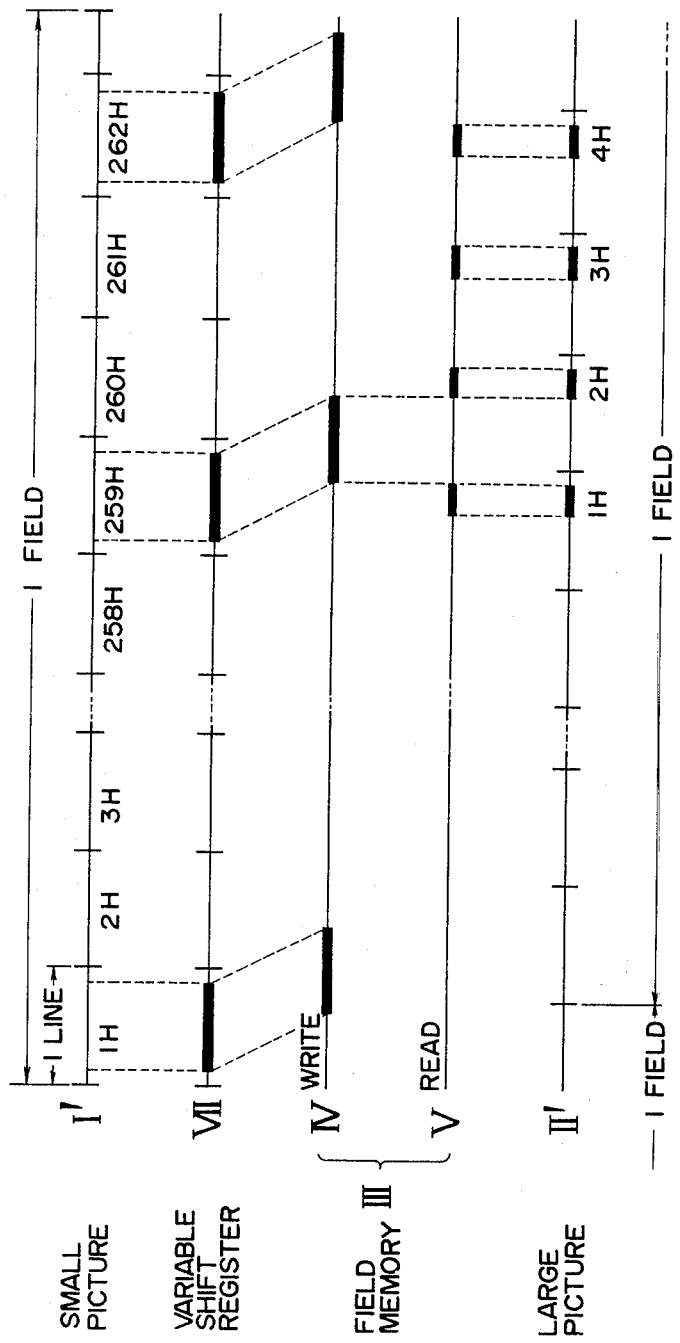

CORRECT    INCORRECT    CORRECT

F I G.15A
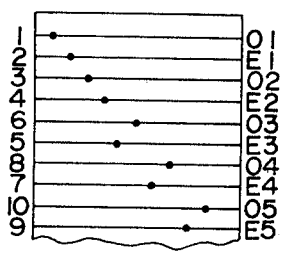
F I G.15B
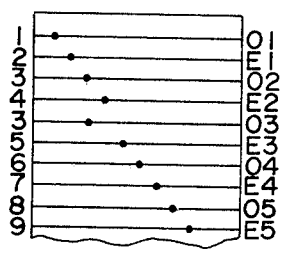
F I G.15C
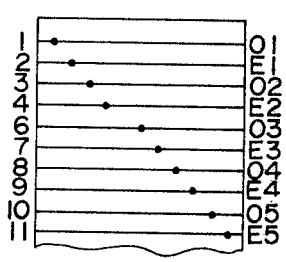
F I G.15D
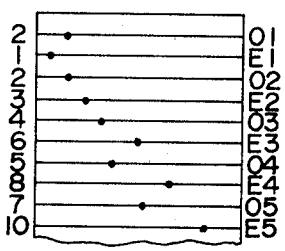
F I G.15E
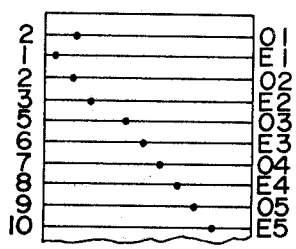
F I G.15F
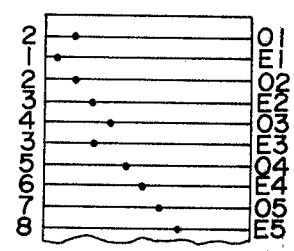
F I G.15G
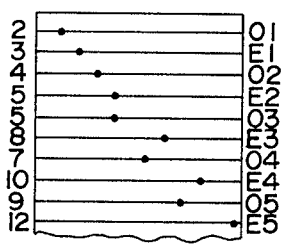
F I G.15H
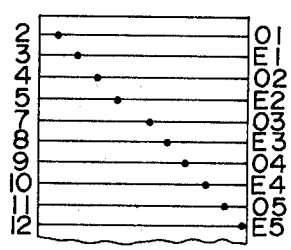
F I G.15I
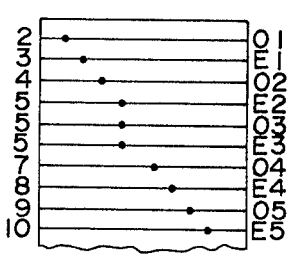

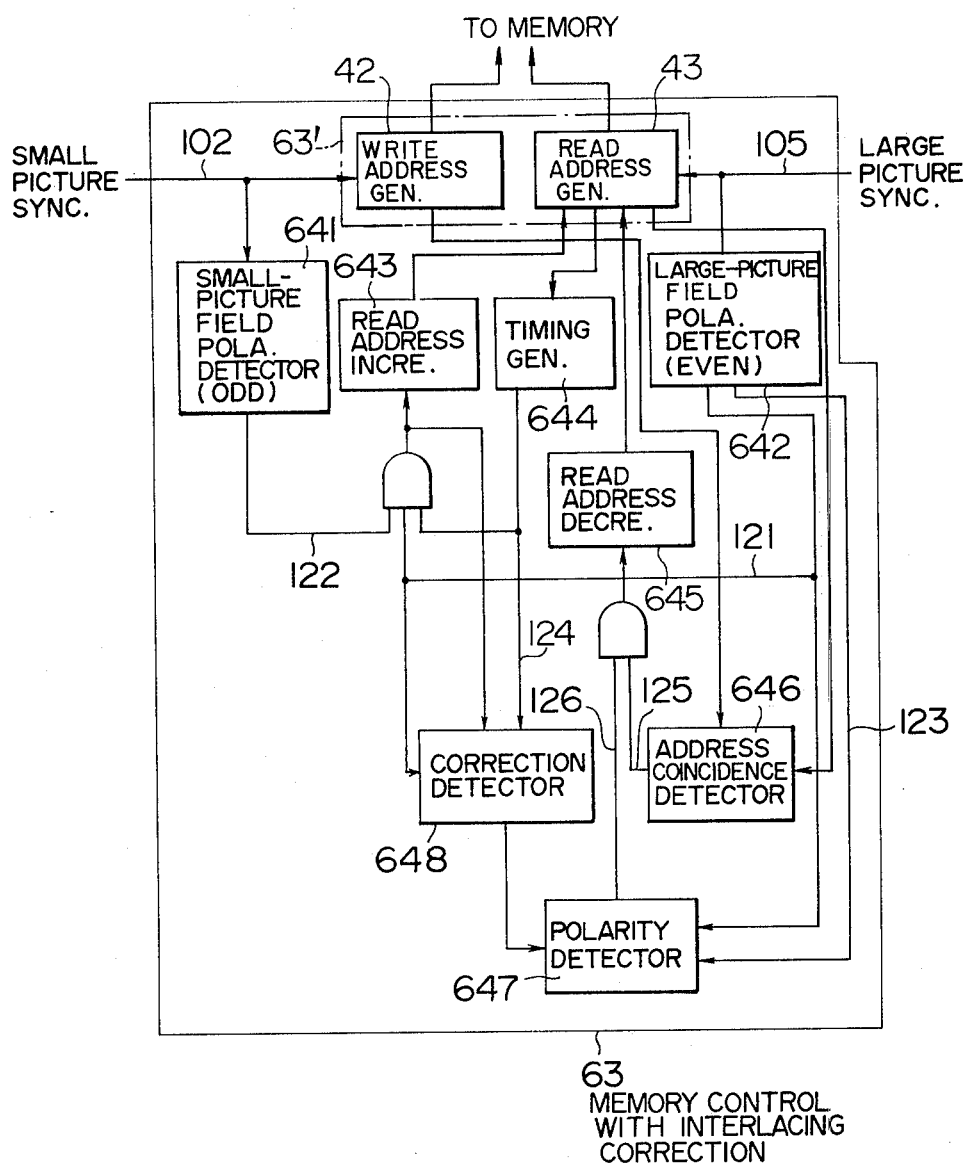

F I G. 17
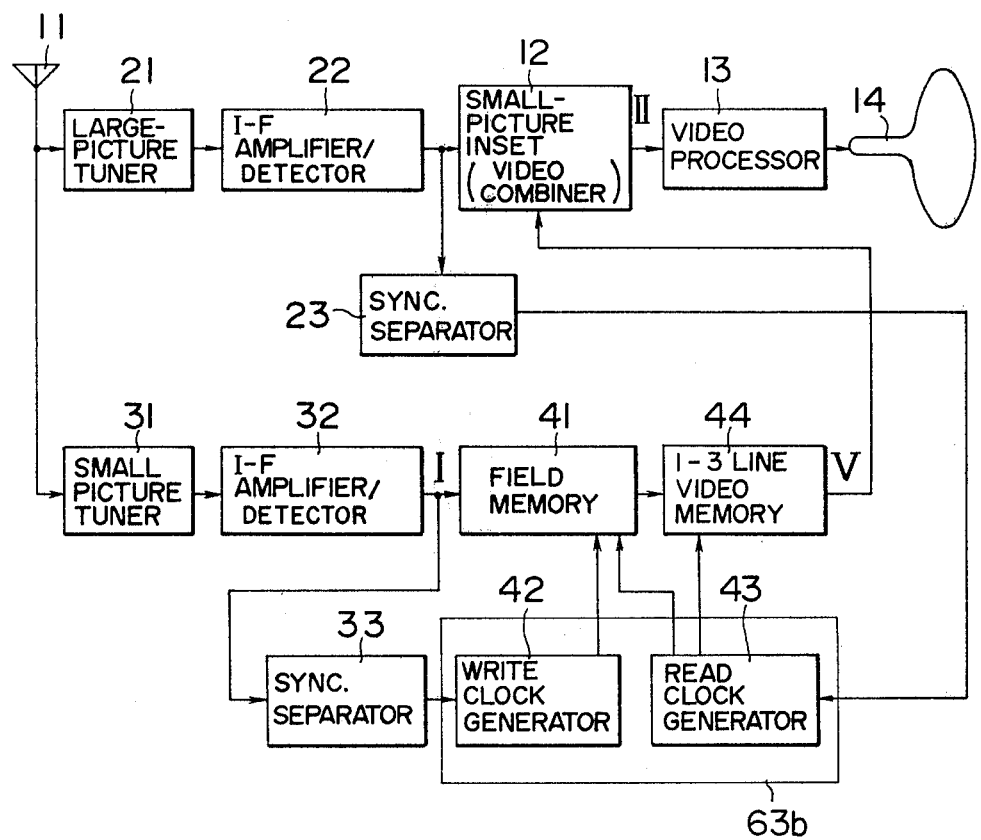

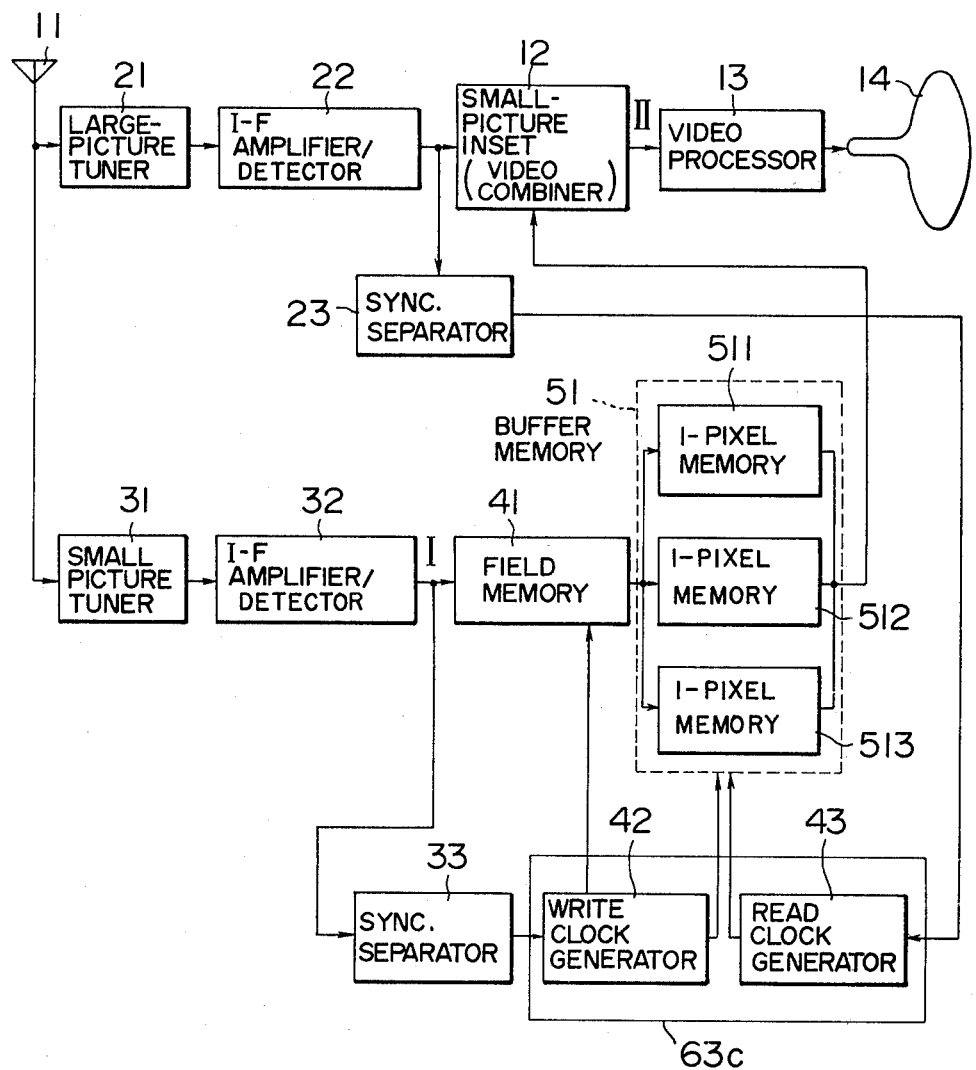
F I G. 20

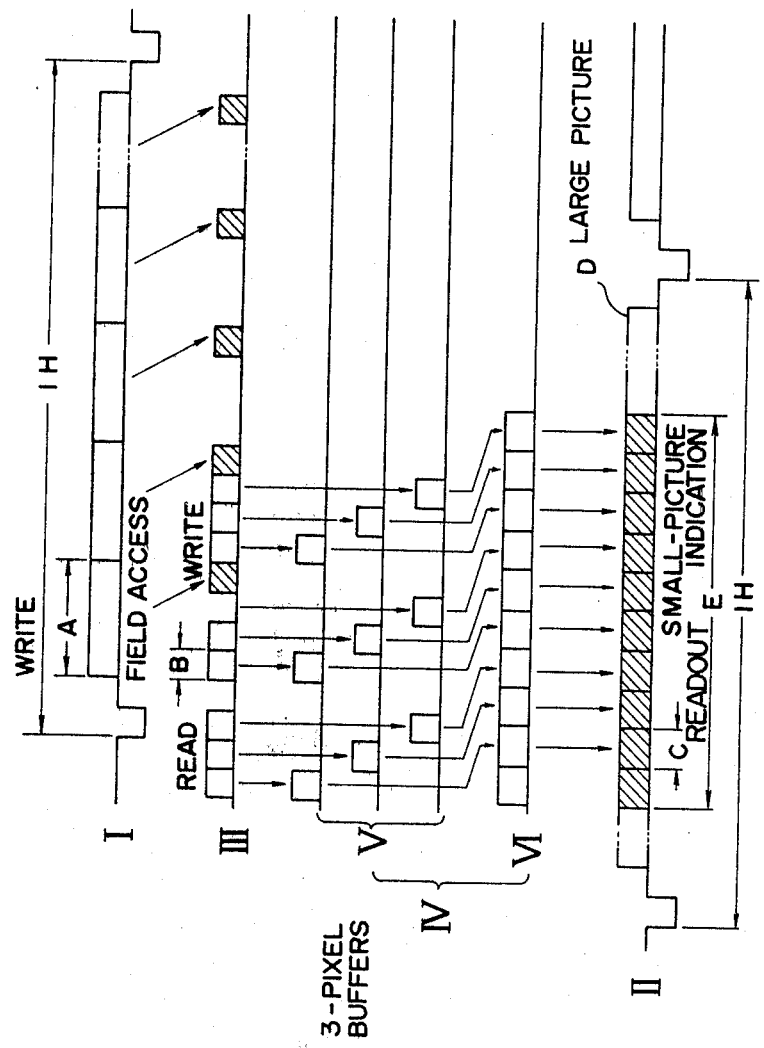

PICTURE-IN-PICTURE TELEVISION RECEIVER

BACKGROUND OF THE INVENTION

The present invention relates to a television receiver capable of insetting in part of a television picture on the screen a picture on another channel, or a picture-in-picture television receiver (hereinafter, referred to as a PinP TV receiver).

Recently, there has been proposed a so-called small-picture inset (PinP) TV receiver in which a reduced small picture of another television program is inset on part of an original television picture for effective use of the cathode ray tube of a television receiver. Such a television receiver has been described in, for example, U.S. periodical "Electronics" Sept. 1, 1977, pp. 102–106 and German patent applications Nos. P2,413,839 and P2,628,737 filed Mar. 22, 1974 and June 25, 1976, respectively. The conception of this PinP television receiver will be described briefly with reference to FIGS. 1 to 4.

FIG. 1 is a conceptional diagram of a PinP TV receiver. In this figure, reference numeral 1 represents a television receiver, 2 a cathode ray tube (CRT), 3 a large picture, and 4 a small picture in which another program picture is reduced and then inset in part of the large picture. The program selection for the large and small pictures can be made independently.

FIGS. 2A and 2B show one example of the PinP reproduction method. Reference numeral I in FIG. 2A represents a small picture before reduction, and II in FIG. 2B a large picture with an inset small picture. Assume that the reduction rate of picture is defined as $$\frac{\text{scanning period after reduction}}{\text{scanning period of the original picture}},$$

when the small-picture reduction ratio is selected $\frac{1}{3}$ for both length and width, sampling of scanning lines from the small picture I is made at the rate of one out of three lines, and the horizontal period of time is reduced to $\frac{1}{3}$ the time base to be in synchronism with the large picture, the small picture thus processed being inset in the large picture. Scanning lines ① to ④ show part of the scanning lines before or after the reduction.

In FIG. 3, the condition of inset small picture is indicated by the time base. At I is shown a video signal of a small picture before reduction, and at II a video signal of a large picture with an inset small picture which results from reduction of picture I. From the video signal I of small picture are sampled scanning lines at the rate of one out of three as shown in FIGS. 2A and 2B, and the sampled lines are written in a field memory III of analog memory such as bucket-brigade-devices (BBDs) or digital memory such as RAMs. The stored lines are read by use of three-fold speed clocks at small picture inset positions in the video signal II of large picture so as to compress the horizontal period of time, and thus a PinP television signal can be produced. At this time, the field memory III is required to have the capacity of storing two fields of A and B, i.e., one frame. Specifically, while the memory A is being read, the next field is written in the memory B, and while the memory B is being read, the next field is written in the memory A.

FIG. 4 is a block diagram of a conventional example of the portions associated with the present invention. Shown at 11 is an antenna, 12 a video combiner or small-picture inset circuit, 13 a video processor circuit, 14 a CRT, 21 a large-picture tuner, 22 an I-F amplifier/detector, 23 a sync. separator, 31 a small-picture tuner, 32 an I-F amplifier/detector, 33 a sync. separator, 34 and 35 first and second field memories A and B, 36 a write clock generator, and 37 a read clock generator.

A small-picture video signal produced from the I-F amplifier/detector through the tuner 31 is written in, for example, the first field memory-A 34 of which the writing operation is controlled by a signal which the write clock generator 36 generates in synchronism with a signal from the sync. separator 33. While the video signal is being written in the field memory-A 34, the video signal which has been stored one-field in advance in the field memory-B 35 is read by a clock pulse which the read clock generator 37 generates in synchronism with a sync. signal separated from a large-picture video signal by the sync. separator 23, and inset in the large-picture video signal by the small-picture inset circuit 12.

As described above, the conventional PinP TV receiver employs two field memories such as BBDs or RAMs which are alternately switched for presenting a picture in picture. In this case, the required capacity of the field memory is calculated as follows. If the scanning lines are reduced to $\frac{1}{3}$, the number of picture elements or pixels to be sampled in each horizontal line period is 100, and the field memory is formed by a digital memory of 8-bit/pixel (or 256 gray scales), then the capacity is given by $$262.5 \times (\tfrac{1}{3}) \times 100 \times 8 = 70 \text{ K bits/field}$$

where $262.5 = 525 \text{ lines} \times \tfrac{1}{2}$ in the NTSC system. Two fields require a 140-k bit memory, which thus makes the design of the PinP TV receiver difficult to a great extent.

SUMMARY OF THE INVENTION

An object of the present invention is to obviate the drawbacks in the above-described prior art and provide a PinP TV receiver in which the capacity of the field memory is reduced to substantially a half, namely a single field memory can be used instead of a one-frame memory.

Another object of the present invention is to provide a PinP TV receiver which includes a single field memory, an interlace correcting circuit and a buffer memory and in which the read and write operations of the aforesaid memory are controlled in timing irrespective of whether the large and small pictures are synchronized or not in transmission.

Still another object of the present invention is to provide a PinP TV receiver in which the capacity of the buffer memory is also reduced in addition to the field-memory capacity reduction as mentioned previously.

Another object of the present invention is to provide a PinP TV receiver in which the capacity of the small-picture purpose field memory absolutely required for PinP TV receiver can be reduced to substantially a half compared with the conventional one and of which the circuit arrangement and its cost can be reduced to a great degree.

In the basic concept of the present invention to achieve the above-mentioned objects, a video signal of small picture to be inset is written in a single field memory line by line as a unit and when time has come to inset in part of the large picture at proper positions, the small-picture video signal is read successively therefrom by a clock pulse at a high speed corresponding to a desired reduction rate 1/n (where, n is positive integers) of picture. FIGS. 5A and 5B are timing diagrams in such a situation. If a write timing W and a read timing R are not overlapped on each other as shown in FIG. 5A, the content of A is read as A' and the content of B as B' as it is. On the other hand, when the read timing R overlaps the write timing W as shown in FIG. 5B, newly stored $B'_1$ and $C'_1$ are read at the beginning of the memory. However, after the write and read addresses coincide with each other, new writing in the memory is not performed, so that the contents of $A_2$ and $B_2$ written in the respective preceding fields are read in the form of $A'_2$ and $B'_2$ instead of $B_2$ and $C_2$, for a PinP TV representation. In these cases, since a small picture and a large picture are processed in fully independent transmission systems and not synchronized with each other at all, there is a great possibility of bringing about a read mode during writing of the field memory. In general, it is difficult to simultaneously read and write a single field memory from a point of view of access speed of memory. To do this, it is necessary to use an expensive device such as the type I 2147 (Intel Corporation). Thus, as another solution to the above problem, the present invention adds to the aforementioned arrangement a variable delay line, for example, a shift register or a buffer memory, for example, a static RAM, of a maximum of one horizontal period (1 line) which is connected before the one-field memory so that write and read timings are not overlapped. Thus, it is possible to achieve the objects of the PinP TV receiver by use of a memory of about one field. In this invention, since write and read operations are sequentially performed during one horizontal scanning as described above, the whole small picture cannot be stored as shown in FIG. 7. In the NTSC system, the maximum time limit is given by $$\frac{\text{picture reduction rate}}{\text{picture reduction rate} + 1} = \frac{1}{n+1} \times 63.5 \, \mu s \, .$$

where the picture reduction rate is 1/n. Thus, a small part of the inset picture is cut off, but the cut off part includes horizontal blanking periods, so that there is no great effect. This is also substantially true for the PAL system. In other words, the pixel information is read during part of one horizontal scanning period in which the inset picture cuts off.

Other objects, features and advantages of the present invention will be apparent from the following description of the embodiments according to the invention as described in detail with reference to the accompanying drawings.

BRIEF DESCRIPTION OF THE DRAWINGS

FIG. 1 is a conceptional diagram of a common PinP TV receiver.

FIGS. 2A, 2B and 3 are diagrams of which reference is made in explaining the method of insetting a small picture into a large picture.

FIGS. 9 and 10 are timing diagrams to which reference is made in explaining the operation of the circuit arrangement of FIG. 8.

FIGS. 15A to 15I are conceptional diagrams showing the interlace correction method on a small picture.

FIG. 16 is a block diagram illustrating a memory control apparatus having an interlace correction function, to control the read and write operations of the single field memory in the invention.

FIG. 17 is a block diagram showing another embodiment of the present invention.

FIG. 20 is a circuit block diagram showing a modified embodiment of the present invention.

FIG. 21 is a timing diagram of the operation of the circuit arrangement of FIG. 20.

DESCRIPTION OF THE PREFERRED EMBODIMENTS

Figure 3:
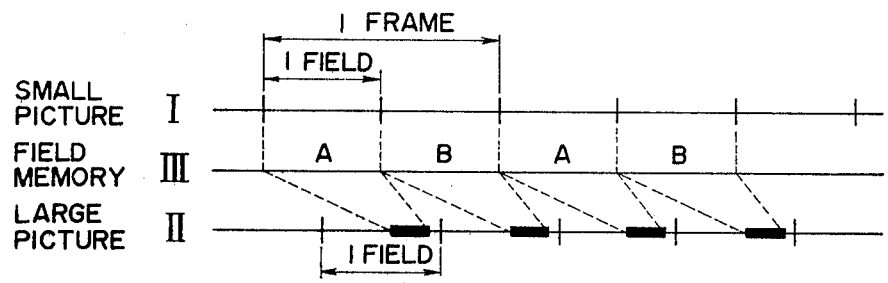
Figure 4:
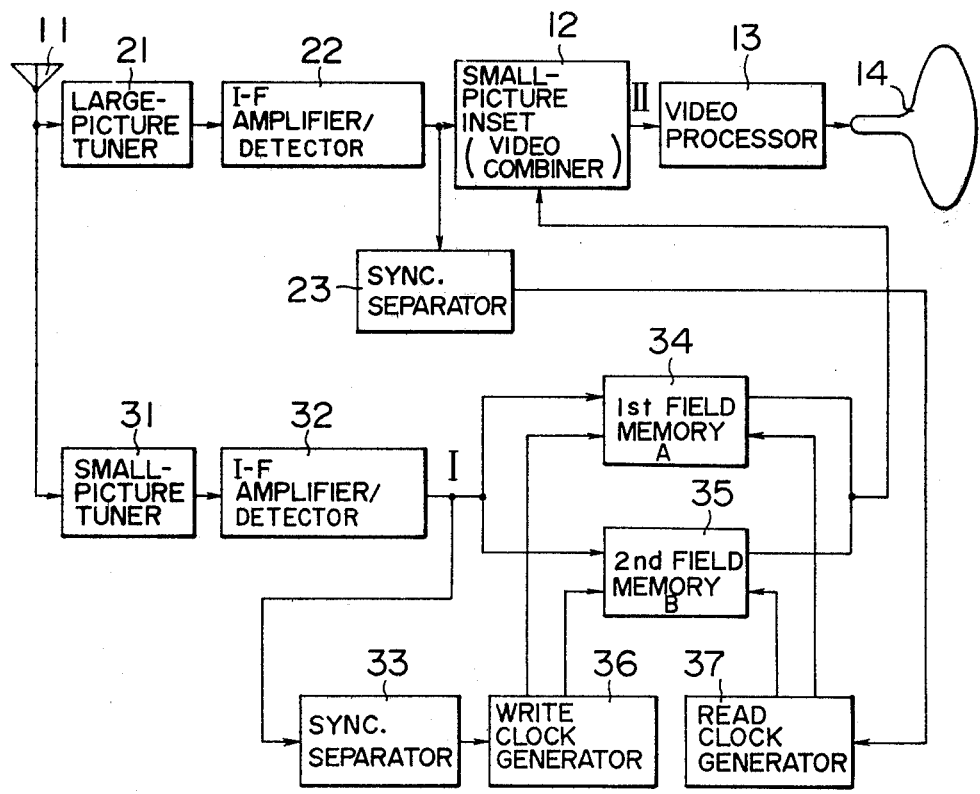
FIG. 4 is a block diagram showing a prior art TV receiver for achieving a small-picture insetting process.
Figure 6:
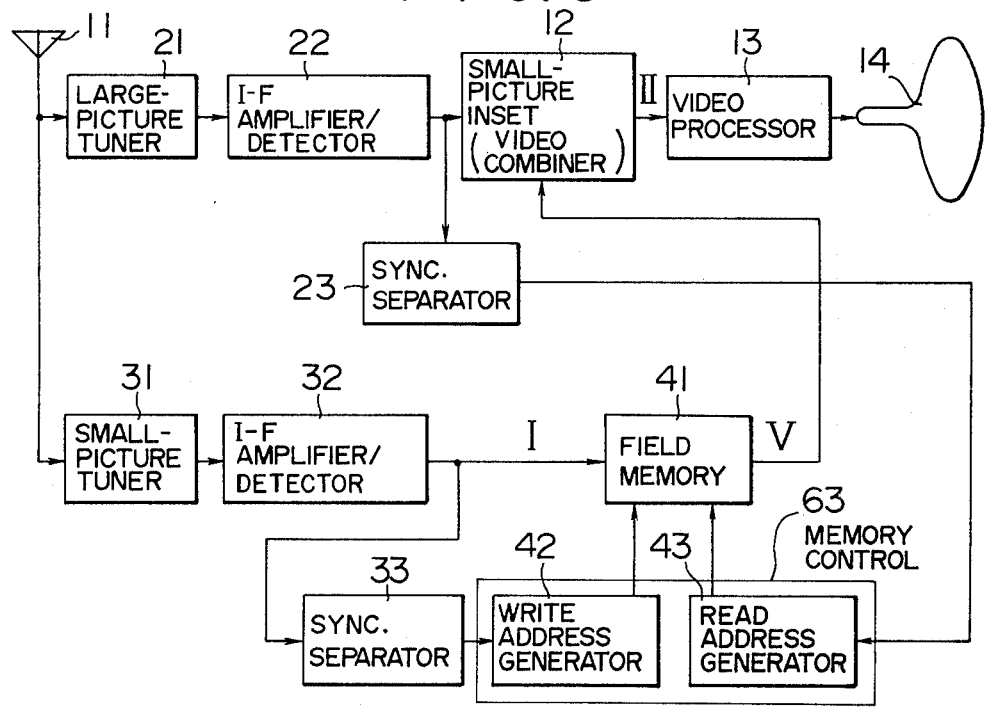
FIG. 6 is a block diagram showing the circuit arrangement of one embodiment of the PinP TV receiver according to the invention.
Figure 7:
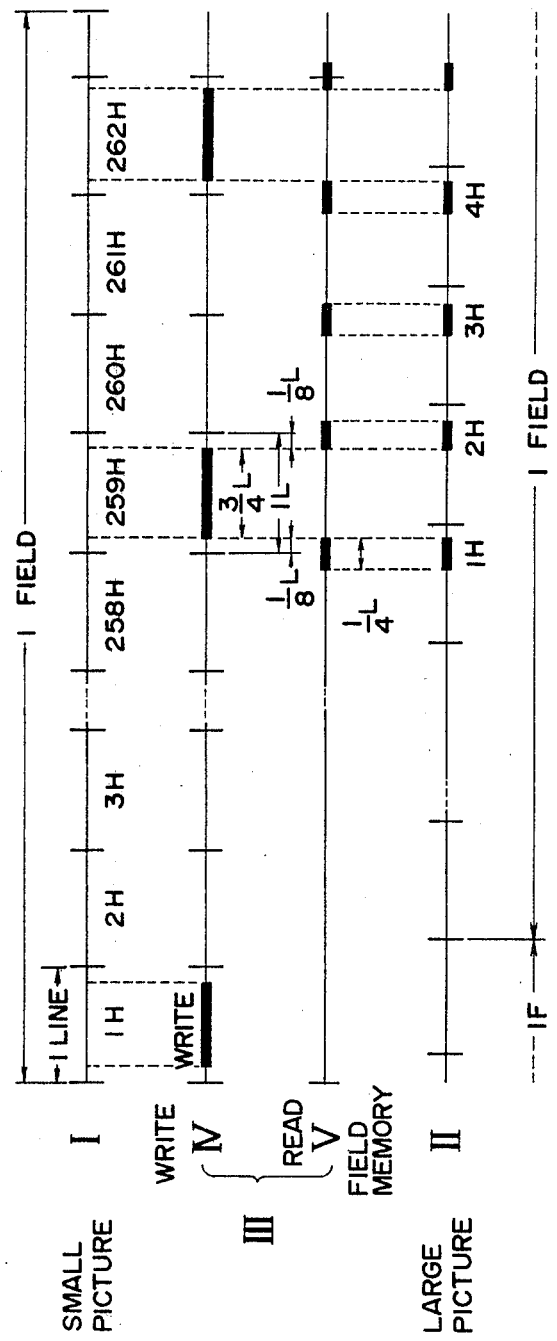
FIG. 7 is a timing diagram to which reference is made in explaining the operation of the circuit of FIG. 6.

The embodiments of the invention employ a small-picture reduction rate of ⅓ in both length and breadth, but the present invention is of course not limited thereto. FIG. 6 shows an arrangement of the invention in which the same reference numerals as those of FIG. 4 show like function blocks. Shown at 41 is a single field memory which can be read or written line by line, and 63 a memory control circuit which includes a write address (clock) generating circuit 42 and a read address (clock) generating circuit 43 and which effects an interlace correcting function as will be described later. The field memory 41 is formed of, for example, 20 4-k dynamic RAMs corresponding to the type MK 4027 made by MOSTEK Co. In this case, an A–D (analog-to-digital) converter and a D–A (digital-to-analog) converter must be provided on the input and output sides of the RAM respectively in order to process a video signal. FIG. 7 is a timing diagram of the operation of FIG. 6. I designates a small-picture video signal, II a large-picture video signal, III a single field (F) memory, IV a write timing, and V a read timing. In the small-picture video signal I, one line of each group of three lines is sampled and stored in the field memory 41 in FIG. 6. When the digital RAM is used, the number of samples during one horizontal period is 100 pixels, with 8-bit/pixel contrast. In this case, all the line is not sampled, but part of one horizontal line excepting the front and rear end portions such as horizontal blanking period, for example, ¾ line is stored. These functions can be easily achieved by the well known techniques. Then, the small-picture signal written in the single field memory is read at predetermined inset positions on the large picture. The reading of the small-picture can be performed taking time of ¼ line because of using a clock frequency three times the write clock frequency. As a result, if the reading starts immediately after completion of writing, the single field memory III is able to achieve the desired PinP with its own one-field capacity, in which case writing and reading operations are not overlapped.

A second embodiment of the invention will now be described.

Figure 8:
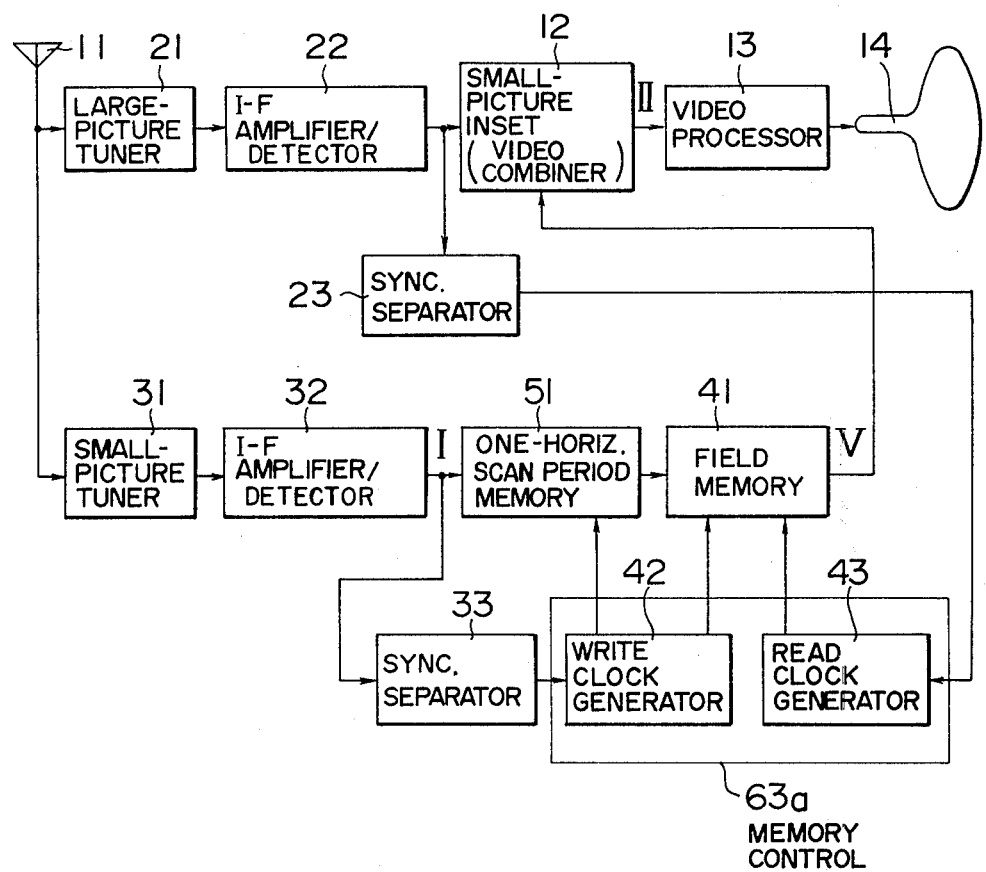
FIG. 8 is a circuit block diagram of another embodiment of the present invention.

In the embodiment of FIG. 6, the small- and large-picture video signals are in a limited synchronism. In other words, when reading is performed immediately after the write timing W, the inset small picture synchronized with the large picture at the horizontal blanking period will cut off at the side edge of the CRT. In view of such a point, the second embodiment of the invention determines the inset position of the small-picture. FIG. 8 shows the arrangement of the second embodiment according to the invention, and FIGS. 9 and 10 are the timing diagrams thereof. In FIG. 8, like parts corresponding to those of FIG. 6 are identified by the same reference numerals. Shown at 51 is a one-line memory of, for example, 128×8 bit static RAM which is formed by MCM6810B (made by MOTOROLA Co.), or one-horizontal scanning period memory such as one-line variable delay line like a 100-bit shift register. FIG. 9 is a timing diagram of the operation of FIG. 8 using the one-line memory 51 and which is similar to FIG. 7. VI represents the timing of the one-line buffer memory. The small-picture video signal I is once stored in the one-line memory 51 and then detection is made of the time that the single field memory 41 is not in the read condition, or of the non-read period between the first and second read periods after writing. Subsequently, the small-picture video signal is written in the single field memory 41. At this time, it is necessary that the one-line memory 51 has no overlap of read and write timings. The single field memory 41 is made in the read condition at the inset timing II of the large picture.

FIG. 10 is a timing diagram of FIG. 8 using a variable delay line as one-line memory 51 and which is similar to FIG. 9. In fact, overlapping of write timing on read timing is permissible in case of using the variable delay line, and thus it is sufficient to have one-line delay. The memories used in the second embodiment are digital RAMs, but they may be analog counterparts from practical point of view.

Figure 5A:
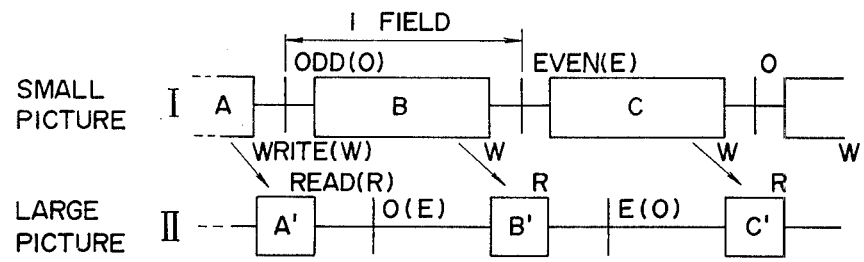
FIGS. 5A and 5B are read/write timing diagrams of a single field memory to which reference is made in explaining the principle of the present invention.
Figure 5B:
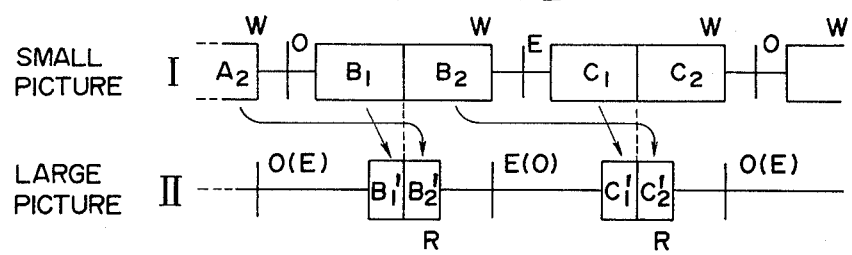
Figure 11A:
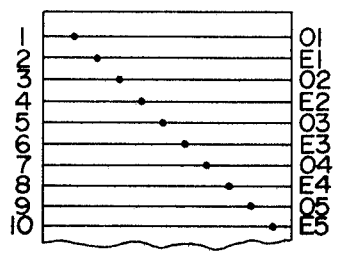
FIGS. 11A to 11D are conceptional diagrams showing the aspects of a small-picture image reproduced during noncorrection of interlace.
Figure 11B:
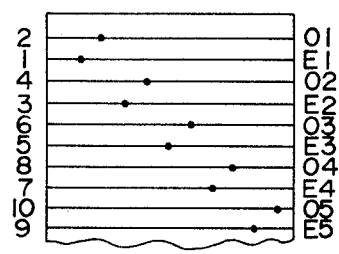
Figure 11C:
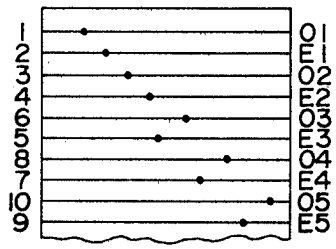
Figure 11D:
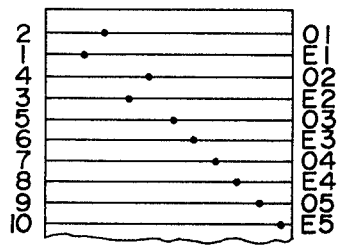

As described previously with reference to FIG. 5B, when read timing overlaps on write timing in the single field memory, the content of field B is stored in the beginning portion, for example B′1 of the memory, but in the end portion thereof has not yet been written the field B. Thus, the content A′2 of the field A therebefore is read, giving rise to non-interlace of field or offset problem. Then, the interlace of television will be considered. The fields of television, or odd and even fields O and E alternately exist on the time base. The odd and even fields O and E include on the CRT respective picture contents which are interleaved with each other from spatial point of view by interlace scanning system. FIGS. 11B to 11D show small-picture conditions with interlacing neglected in case of FIGS. 5A and 5B, and FIG. 11A shows a proper reproduction. The lengthwise lines represent horizontal scanning lines, the numbers on the left-hand side are contents thereof, and the characters are the order of horizontal scanning lines in each field O or E. For example, O1 denotes the first line in odd field O from the top, and E4 the fourth line in even field E from the top.

In case of FIG. 5A, since the video signal written in the memory III is of odd or even field, reading is made at the illustrated timing and at the same field as the written odd or even field, thus giving proper reproduction of FIG. 11A. However, when the read timing is contrary to the above case, as shown by parenthesized O or E, the content of field O is read at field E and the content of field E is read at field O, as shown by the notched pattern in FIG. 11B (particularly, a slant-line picture pattern gives a good example). In FIG. 5B, field coincidence is made upon reading and writing to the intermediate portions (B′1 and C′1), thus giving a proper reproduction, but at A′2 and B′2 portions the field coincidence is not made upon reading and writing. That is, since the field-E video signal is read at field O or vice versa, a zig-zag improper pattern picture is presented at portions (from O3, E3) as shown in FIG. 11C. Also in FIG. 5B, when the read field is reversed as parenthesized portions, a zig-zag-like improper pattern in the area (to O2, E2) and a proper pattern in the following area (from O3, E3) are reproduced as shown in FIG. 11D.

As described above, in the PinP TV receiver, the small-picture video image becomes zig-zag-like and hence reduced in picture quality because of faulty interlace. Thus, to produce a good-quality small picture it is necessary to obviate such a defect.

The zigzag pattern picture resulting from non-interlacing in a small picture as described previously is caused by three possible factors. However, all the factors are difficult to be removed simultaneously. Thus, the present invention is arranged so that first, proper interlacing is devised at the top of a small picture, and subsequently the change of field of picture image is detected during the small-picture reproduction, at which time the read address is corrected to provide proper interlacing.

Figure 12:
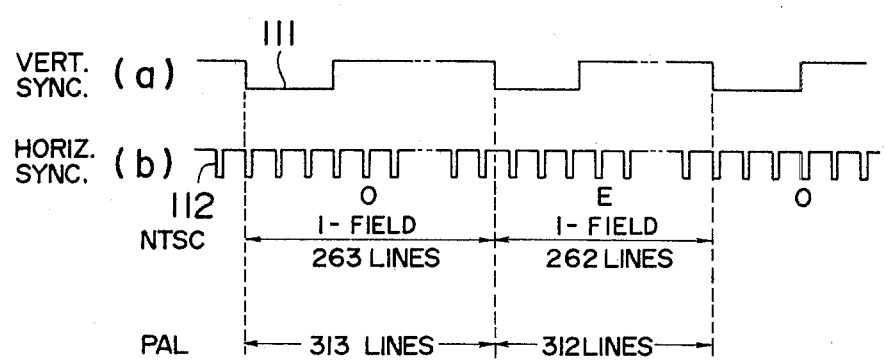
FIG. 12 is a diagram showing waveforms of synchronizing signals for indicating the difference in the field polarity of TV pictures.

To this end, it is necessary in the invention to generate a signal showing what field (field O or E) is written in or read from the field memory. FIG. 12 is a diagram showing the difference between the fields O and E. At (a) is shown a vertical sync. signal (V signal), and at (b) a horizontal sync. signal (H signal). The fields O and E include a different number of H signals in one-field and a different phase relation between the H and V signals as illustrated. Thus, the detection of field O or E can be simply made by counting the number of H signals during one field period or by detecting the phase between the H and V signals.

Figure 13:
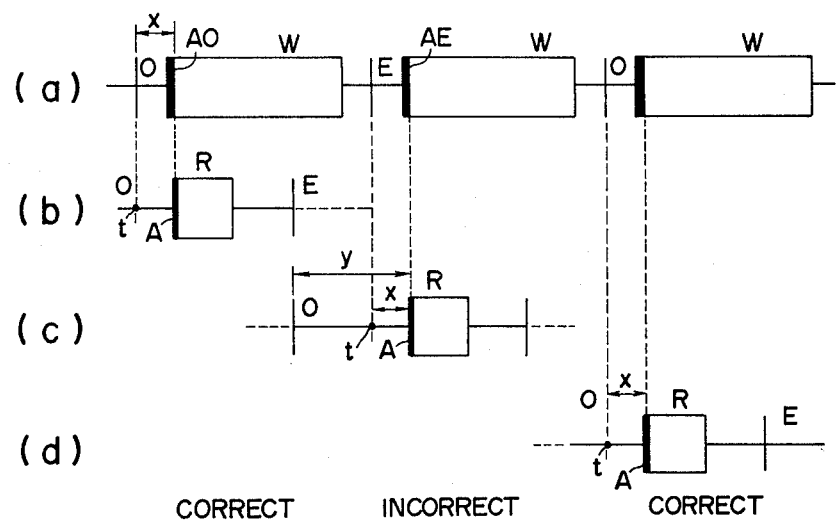
FIG. 13 is a diagram of models showing the detection method in case that non-interlacing occurs at the top of a small picture.

A method of detecting whether proper interlacing is made or not at the top of a small picture will be described below. FIG. 13 shows the situation under which the timings of writing (synchronization of a small-picture video signal) and reading (synchronization with a large-picture video signal) come to be shifted. In this case, the read timing is delayed in the order of (b), (c) and (d) from the write timing at (a). When the read timing is between (b) and (c) as illustrated, the content of part A of field O is read at the top (part A) of field O, and thus proper interlacing is made at the top of the small picture. When the read timing is between (c) and (d), the content of part A of field E is read at the top (part A) of field O, and thus non-interlacing occurs at the top of the small-picture, giving rise to a zigzag pattern picture. Since the case (d) is the same as (b) from a view point of writing and reading phase relation, the above two cases considered give a satisfactory result. If x is taken as the time interval from the top of field of a small-picture video signal (precisely, the point that the detection outputs of fields O and E are switched) to the time that the first 1H writing is finished, and y as the time interval from the top of field of television picture (or large-picture) to the time that the small-picture reading begins, the condition y>x is usually satisfied. Thus, when decision is made of whether the field polarity of the small-picture video signal (field O or E) coincides with that of the large-picture video signal or not at a timing t preceded by x from the time that the small-picture reading begins, the above-mentioned cases can be identified. That is, if the field polarities of both pictures are the same at timing t, proper interlacing is made at the top of the small-picture, but if not, improper interlacing occurs.

Figure 14A:
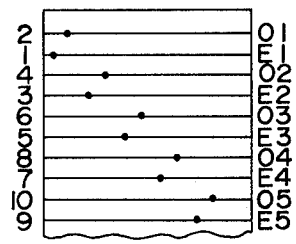
FIGS. 14A to 14C are conceptional diagrams showing the interlace correction method at the top of a small picture.
Figure 14B:
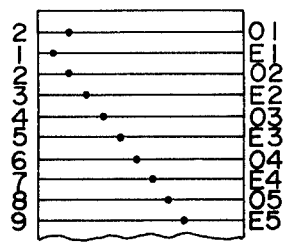
Figure 14C:
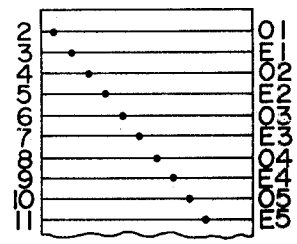

A method of correcting the interlacing at the top of the small-picture will be described below. FIG. 14A is the same as FIG. 11B, and shows conceptually the improper interlacing at the top of small-picture. The correction is made by decrementing the read address once (one line) at field O when reading is made from the memory as shown in FIG. 14B, or by incrementing the read address at field E once (one line) as shown in FIG. 14C.

Description will be made of a method of detecting when interlacing is improper during small-picture reproduction. When the field polarity of the content to be read in FIG. 5B is reversed, an address signal stored in the single field memory and an address signal read from the signal field memory are the same at the boundary between B'$_1$ and A'$_2$ or between C'$_1$ and B'$_2$. In this case, the way of making address (clock) signals decides whether the time of coincidence is included in B'$_1$ or C'$_1$ or in A'$_2$ or B'$_2$. In general, the field polarity of the content to be read is reversed near the time both address signals coincide with each other. Therefore, it is necessary to determine whether correction is made at the time of coincidence of both address signals or at the next reading time in accordance with the system used.

Description will next be made of a method of correcting non-interlacing during small-picture reproduction. FIG. 15A is the same as FIG. 11C and shows that non-interlacing begins from the third line of each field. In this case, it is necessary that as shown in FIG. 15B the read address be decremented, upon reading, by one at field O after the time of non-interlacing or that as shown in FIG. 15C, the read address be incremented by one at field E. FIGS. 15D and 15G show correction of improper interlacing at the top of small-picture by the above methods of FIG. 14B or 14C under the condition of FIG. 11D. The correction of FIG. 15D is made by the method of FIG. 14B, and FIG. 15G by FIG. 14C. In such cases, it is necessary that after the time of non-interlacing, the read address be incremented, upon reading, by one at field O as shown in FIG. 15E or 15H, or that the read address be decremented upon reading by one at field E as shown in FIGS. 15F and 15I.

FIG. 16 is one example of the memory control circuit 63 performing interlace correction in the single field memory system of the present invention. The control circuit 63 comprises address signal generator 63' which includes read and write clock signal generating circuits 42 and 43 for reading and writing the field memory 41 of FIG. 6, and an interlace correcting circuit associated with address signal generator 63'.

The operation will first be described of the interlace correction at the top of the small-picture. Referring to FIG. 16, a field polarity detector circuit 641 for a small-picture video signal produces a field-O signal (a high signal at field O) output 122, a field polarity detecting circuit 642 for a large-picture video signal produces a field-E signal output 121, and a timing generator circuit 644 produces at timing t (see FIG. 13) signal output 124. These three outputs are applied to an AND gate, which produces a logical "high" signal when the field polarities of small- and large-picture video signals are not the same at timing t (that is, it is necessary to correct interlacing at the top of the small-picture) and when the large-picture image is at an even field. Thus, this signal is applied to a read address increment circuit 643 by which the read address is incremented by one at the time of reading a reproduced signal of small-picture starting at x of this signal (see FIG. 13), and thus the correction of FIG. 14C can be performed.

The operation will now be described of interlace correction during small-picture reproduction. As shown in FIG. 15, the interlace correction in the course of reproducing small-picture must be changed in its way depending on whether correction is made or not at the top of small picture. First, a correction detector circuit 648 generates a signal indicative of whether correction is made or not at the top of small-picture, and supplies it to a polarity selecting circuit 647. The circuit 647 is responsive to this input to produce a field-O signal of large-picture when interlace correction is not made, or a field-E signal of large-picture when correction is made. This field-O or -E signal is represented by a selected polarity signal 126, which is applied to an AND gate together with an address coincidence signal output 125 from an address coincidence detector circuit 646. The output of the AND circuit is applied to a read address decrement circuit 645. That is, when correction is not made at the top of small picture, the address is decremented, upon coincidence of address, by one at field O, thereby achieving the correction of FIG. 15B, while when correction is made at the top of small picture, the address is decremented, upon coincidence of address, by one at field E, thereby achieving the correction of FIG. 15I. Other circuit arrangements can be devised easily by those skilled in the art from the above-mentioned examples, and thus the specific description thereof will be omitted.

By this interlace correction means of the invention, a small picture of good quality without zigzig pattern can be attained with only provision of a single field memory.

Figure 18:
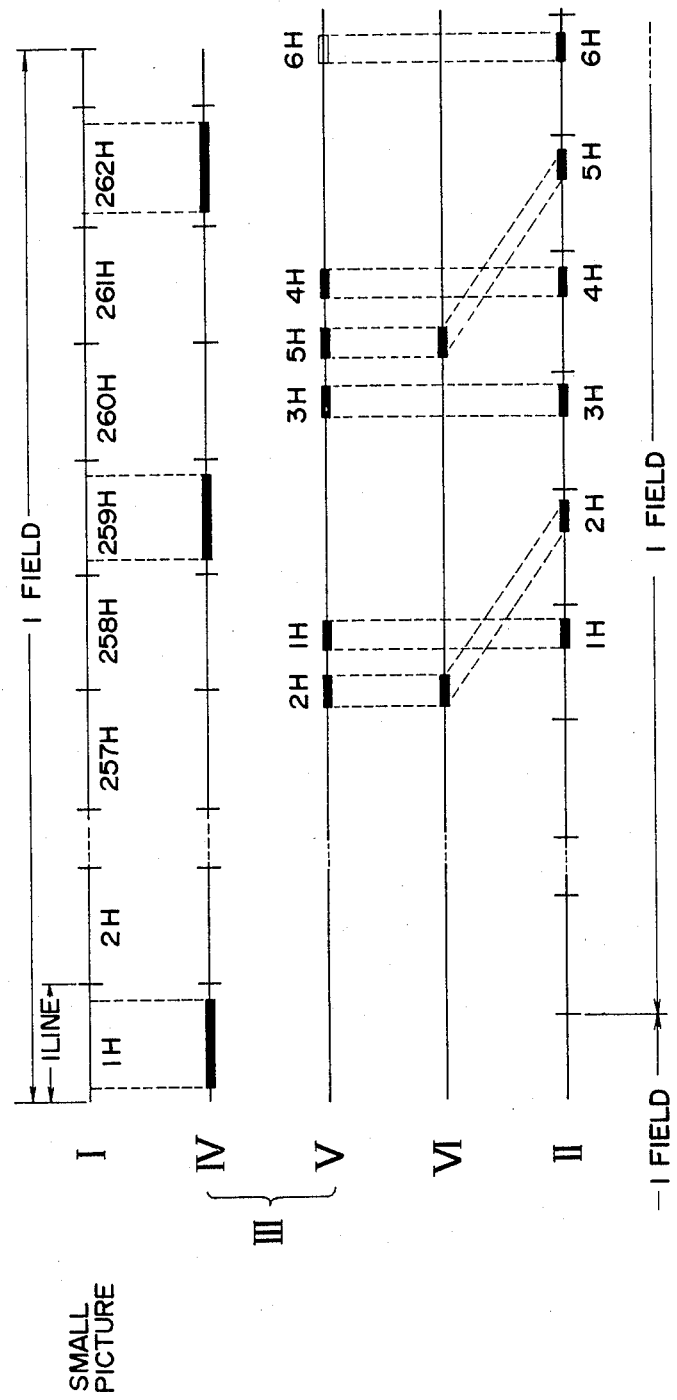
FIGS. 18 and 19 are timing diagrams to which reference is made in explaining the operation of the circuit arrangement of FIG. 17.
Figure 19:
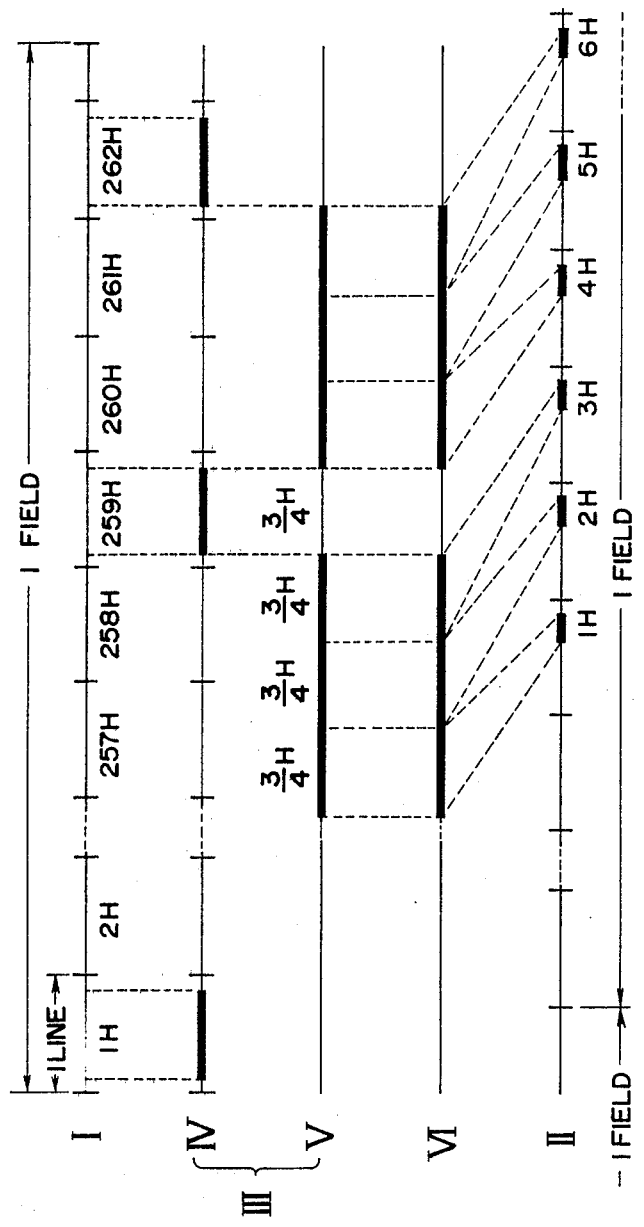

The embodiment of FIG. 6 provides limited sychronization between the small- and large-picture video signals as described previously. That is, if, for example, reading is made immediately after write timing, the inset small-picture is cut off at the side edge of the CRT when the large-picture is synchronized at positions corresponding to the horizontal blanking period. Considering such an aspect, another solution for specifying the inset position is provided, which will be described with reference to the embodiments of FIGS. 17 to 19. FIG. 17 is a block diagram of the embodiment, and FIGS. 18 and 19 are timing charts. In FIG. 17, like elements corresponding to those of FIG. 6 are identified by the same reference numerals. Shown at 44 is a video memory of one of three lines. FIG. 18 is a timing chart when a one-line video memory is used for the video memory 44, and FIG. 19 is a timing chart when a three-line video memory is used for the video memory 44. I to V indicate the same ones as in FIG. 7, and VI represents a timing when the video memory 44 is made in write and read operations.

In FIG. 18, when insetting of a small-picture in a large-picture starts in the write timing IV of the single-field memory 41, write and read operations in the single-field memory are overlapped, so that it is necessary to shift the read timing (2H, 5H, ...). Thus, the video memory 44 of one-line memory used as a buffer is predeterminately made in a write condition during a period the single field memory is not operative for writing, and at a desired read timing, reading is made from the one-line memory, thereby preventing overlapping. FIG. 19 is a timing chart when a three-line video memory is used for the video memory 44. In this case, the time taken when the single field memory 41 transfers a signal to the three-line memory can be extended longer than in case of FIG. 18, thus the access time to the single field memory 41 can be made long. While in the embodiments, a single small-picture inset in a large picture is presented under the title of a picture-in-picture TV receiver for convenience, insetting of two or more small pictures can be of course performed similarly. In addition reference numeral 63b designates an interlace correction/address control circuit. The circuit 63b is essentially the same as the circuit 63, but it also serves to supply an address timing signal to the memory 44, thus in this respect the circuit arrangement of FIG. 16 is modified.

As described previously, small- and large-pictures are processed in fully isolated transmission sections which have no synchronizing relation therebetween. Therefore, read timing comes during writing with a great possibility. Thus, the embodiment as shown in FIGS. 20 and 21 is arranged so that the operation frequency of the single-field memory is selected higher than the sum of the read and write frequencies, thereby preventing overlapping of read and write timings. In addition, a buffer memory is provided at the next stage to the single-field memory so as to change the operation frequency of the single field memory to a predetermined read frequency, thereby achieving the objects of the PinP TV receiver with the single field memory. The embodiment of FIG. 20 basically employs three small-capacity pixel buffer memories instead of, for example, the buffer memory 44 of 100-pixel capacity per one horizontal period which is used in FIG. 17.

While in the embodiments the length and breadth of a small picture are both reduced to ⅓, the present invention is not limited thereto, but may be of course generally reduced to 1/n. FIG. 20 is a block diagram of one embodiment of the present invention, in which the same reference numerals as in FIG. 6 represent like function blocks. Shown at 41 is a single field memory formed by, for example, a RAM of 9.6 MHz access rate when the writing frequency is 2.4 MHz and the reading frequency is 7.2 MHz, 63c an interlace correction/address control including the write clock generating circuit 42 and the read clock generating circuit 43, and 51 a buffer memory formed of three one-pixel memories 511, 512 and 513.

FIG. 21 is a timing chart of FIG. 20 and shows an enlarged horizontal period (shown by 1H in the illustration) of the period in which write and read timings coincide with each other in I, and III of FIG. 5B. In FIG. 21, I represents a small-picture video signal, II a large-picture video signal, III a timing in the single field memory, IV a timing in the buffer memory, V the write timing, and VI the read timing. Also, A represents a write period, B an access period of the single field memory, C a read out period, D a large-picture video signal, and E a small picture display period. In the illustration, the access frequency $f_M$ of the single field memory 41 is determined by predetermined write frequency $f_W$ of small-picture signal and read frequency $f_R$ ($\approx 3f_W$) as follows:

$$f_M \approx f_W + f_R \approx 4f_W$$

Therefore, the access period B of the single field memory 41 is about ¼ of the write period A of small picture. Writing of the small-picture signal occurs once at every four access periods. Reading thereof occurs three times at every four access periods except the write period. The pixel information read from the single field memory 41 is stored in the three pixel memories 511, 512 and 513 in sequnece as shown by V in FIG. 21. The buffer memory 51 serves to change the access speed of the single field memory 41 to a predetermined read speed. The pixel information read at a predetermined read timing from the buffer memory 51 is applied to the small-picture inset circuit 12 where it is added as a small-picture signal to a large-picture and supplied to the CRT.

In accordance with the present invention, the memory capacity necessary for the PinP TV receiver can be substantially reduced to a half as compared to the conventional one, the circuit size is decreased, the PinP TV receiver can be manufactured at a low cost, and so on. As will be apparent from the above description, when the small-picture reduction rate is 1/n, the buffer memory 51 must be formed by n one-pixel memories.

While in the above embodiments a digital RAM is used as a single-field memory, BBD of random access type not of prior art shift register type and CCD (charge coupled device) memory can also be used in the PinP TV receiver according to the invention as will be easily understood by those skilled in the art.

We claim:

1. A picture-in-picture television receiver having a first-television picture tuner and a first I-F amplifier/detector for receiving a program of a first television picture, a second-television picture tuner and a second I-F amplifier/detector for receiving another program of a second television picture, a common video signal coupling means, a video signal processing means and a display means, and in which the second television picture is compressed at a reduction rate of 1/n (n: positive integers) and inset as a small picture in part of the first television picture, said picture-in-picture television receiver comprising:

(a) a single field memory means coupled between said second I-F amplifier/detector and said common video signal coupling means and capable of randomly reading and writing a video signal of the second television picture each horizontal scanning period as a unit, and (b) memory control means responsive to sychronizing signals of said first and second television pictures for generating a first clock signal and a second clock signal whose frequency is n times the frequency of said first clock signal, said first clock signal being supplied to said field memory for writing therein contents of said small picture each horizontal scanning period, said second clock signal being supplied to said field memory for reading out the contents stored in the field memory each horizontal scanning period in no write condition to render the contents of small picture to be supplied to said coupling means for coupling the second television picture signal with the first television picture signal;

whereby the second television picture can be inset in the first television picture.

2. A picture-in-picture television receiver according to claim 1 wherein the time during which said second television picture to be inset is written in said single field memory is selected to be less than (reduction rate of small picture)/{(reduction rate of small picture)+1}=1/(n+1) of the horizontal scanning period.

3. A picture-in-picture television receiver according to claim 1 comprising a memory of which capacity is at least one horizontal period of video signal, between said second I-F amplifier/detector and said field memory, and said memory control means having a means for generating an address signal so that said small-picture signal is once written in said one-line memory and subsequently generating an address signal so that the signal stored in said one-line memory is transferred to said single field memory means while said single field memory means is not in read condition.

4. A picture-in-picture television according to claim 3 wherein said one-line memory is a variable shift register.

5. A television receiver wherein a first television picture is normally reproduced and a second television picture is compressed and inset as a small picture in part of the first television picture, said television receiver comprising:
single field memory means in or from which a video signal of said second television picture can be randomly written or read one horizontal line by line as a unit;
means for controlling the read and write operations of said memory means in response to the synchronizing signals of said first and second television pictures; and
buffer memory means in or from which at least one-horizontal line of a video signal can be written or read line by line and which is connected to the output of said single field memory means;
said memory control means supplying a control signal to said single field memory so that the second television picture video signal is written in said single field memory means, and supplying a control signal to said single field memory and said one-line memory so that part or all of said written signal is read through said at least-one-line memory means, and that the other part thereof is directly read to be inset in said first television picture.

6. A television receiver according to claim 5 wherein said at least-one-line memory means is formed of at least a one-line video memory, and at least one-line video signal written into said one-line memory means from said single field memory is read at a given read timing while said single field memory is not in write condition and inset in the first television picture.

7. A television receiver according to claim 6 wherein a plurality of said horizontal-line memory means are provided for extending the time taken when information is transferred from said single field memory means.

8. A picture-in-picture television receiver wherein a first television picture is normally reproduced and a second television picture is compressed to 1/n and inset in part of the first television picture through a video coupling circuit provided therein, said picture-in-picture television receiver comprising:
a single field memory in or from which a video signal of the second television picture can be written and read at an arbitrary timing;
n one-pixel information storage means which are connected to the output of said single field memory and in or from which information is written and read in sequence; and
memory control means which supplies a control signal to said single field memory means and said storage means in response to the synchronizing signals of said first and second television pictures to thereby control the read and write operations of said single field memory and said storage means;
said memory control means comprising a first clock signal generator which generates a write clock signal to write said second television picture signal in the field memory, means for reading the small-picture signal which has been stored in said single field memory by the application of the first-clock signal during the time except said writing and temporarily writing the read small-picture signal in said n storage means, and a second-clock signal generator for controlling the small-picture signal to be read from the said n storage means, the small-picture signal thus read being supplied to said coupling circuit.

9. A picture-in-picture television receiver according to claim 8 wherein the frequency of the first-clock signal is not lower than the sum of the frequency of the second-clock signal and a predetermined write frequency used when the second television picture signal is written in said single field memory.

10. A picture-in-picture television receiver wherein a first television picture is normally reproduced and a second television picture is compressed to 1/n and inset as a small picture in part of the first television picture, said picture-in-picture television receiver comprising:
(a) first and second tuners for first and second television pictures, respectively;
(b) first and second I-F amplifiers/detectors for the first and second television pictures, respectively;
(c) first and second synchronizing separators for the first and second television pictures, respectively;
(d) an A/D converter for converting the analog output from said second I-F amplifier/detector to a digital signal;
(e) a memory control means for generating a memorywriting first timing signal on the basis of the synchronizing signal from said second synchronizing separator and a memory-reading second timing signal on the basis of the synchronizing signal from said first synchronizing separator, the frequency of said first timing signal being n-times the frequency of said second timing signal;
(f) a one-line buffer memory means in which the second television picture signal converted by said A/D converter is temporarily written by the application of said first timing signal;
(g) a RAM capable of storing a single-field video signal of the second television picture which RAM is connected to the output of said buffer memory means and by which information can be written and read freely line by line as a unit in response to the write and read timing signals from said memory control means;

(h) an D/A converter for converting the digital video signal read from said single field RAM, to an analog signal; and (i) a video-signal coupling/displaying means for coupling said read analog video signal and the output of said first I-F amplifier/detector and for insetting the second television picture in the first television picture;

said memory control means generating a write timing signal so that the time taken when the second television picture to be inset is written in said single field RAM is less than $1/(n+1)$ of one horizontal scanning period.

11. A picture-in-picture television receiver according to claim 1, 5, 8 or 10 wherein said memory control means comprises a means for detecting the field polarities of the first and second television pictures, a means for detecting, whether the field polarities of the first and second television pictures are the same or not, at the time point preceding by the time from the change of the field polarity of the second television picture to the completion of writing the first one-line information in said memory before the first one-line information is begun to be read from said memory, and, if not the same, incrementing or decrementing by one-line unit an address read from said memory at the top of said small-picture in either of the field polarities, thereby correcting interlacing, a means for detecting the presence or absence of said interlace correction, and a means for detecting coincidence of the write address and read address of said memory, and incrementing or decrementing by one-line unit an address read from said memory in either field polarity of the second television picture in accordance with the presence or absence of said correction, thereby correcting interlacing of the second television picture relative to the first television picture.

* * * * *